(12) United States Patent
Rinne et al.

(10) Patent No.: US 9,504,036 B2
(45) Date of Patent: Nov. 22, 2016

(54) CONFIGURING CELLULAR CONNECTIVITY (75) Inventors: Mika Rinne, Espoo (FI); Mikko Uusitalo, Helsinki (FI); Antti Sorri, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 73 days.

(21) Appl. No.: 14/003,610

(22) PCT Filed: Mar. 11, 2011

(86) PCT No.: PCT/FI2011/050214
§ 371 (c)(1),
(2), (4) Date: Sep. 6, 2013

(87) PCT Pub. No.: WO2012/123616
PCT Pub. Date: Sep. 20, 2012

(65) Prior Publication Data
US 2013/0344883 A1   Dec. 26, 2013

(51) Int. Cl.
*H04W 72/04* (2009.01)
*H04L 5/00* (2006.01)
*H04L 27/00* (2006.01)
*H04W 72/02* (2009.01)
*H04W 72/08* (2009.01)

(52) U.S. Cl.
CPC .......... *H04W 72/0453* (2013.01); *H04L 5/001* (2013.01); *H04L 5/0064* (2013.01); *H04L 5/0085* (2013.01); *H04L 5/0087* (2013.01); *H04L 5/0092* (2013.01); *H04L 27/0006* (2013.01); *H04W 72/02* (2013.01); *H04W 72/082* (2013.01)

(58) Field of Classification Search
CPC ... H04W 36/30; H04W 36/18; H04W 24/00; H04W 84/18; H03G 3/3042; H03G 3/3036
USPC .......... 455/436–439, 452.1–2, 67.11, 67.13, 455/115.1, 115.3, 41.1–2; 370/331–332
See application file for complete search history.

(56) References Cited

U.S. PATENT DOCUMENTS

| | | | | |
|---|---|---|---|---|
| 5,740,534 | A * | 4/1998 | Ayerst | H04W 88/022 340/7.42 |
| 6,603,755 | B1 * | 8/2003 | Parker | 370/342 |
| 7,813,744 | B2 * | 10/2010 | Johnson | 455/464 |
| 8,428,028 | B2 * | 4/2013 | Kim et al. | 370/331 |
| 8,908,638 | B2 * | 12/2014 | Chi et al. | 370/331 |
| 2008/0240024 | A1 | 10/2008 | Rao et al. | |

(Continued)

FOREIGN PATENT DOCUMENTS

| | | |
|---|---|---|
| EP | 1750466 A1 | 2/2007 |
| WO | 0131942 A1 | 5/2001 |

OTHER PUBLICATIONS

International Search Report and Written Opinion received in corresponding Patent Cooperation Treaty Application No. PCT/FI2011/050214. Dated Nov. 4, 2011. 12 pages.

*Primary Examiner* — Cong Tran
(74) *Attorney, Agent, or Firm* — Mintz Levin Cohn Ferris Glovsky and Popeo, P.C.

(57) ABSTRACT

A method, apparatus, and computer program for configuring a terminal device of a cellular system to propose aggregation of unlicensed frequencies for the use of the terminal device. A network element receiving the proposal processes the proposal and configures the aggregation of the unlicensed frequencies.

21 Claims, 4 Drawing Sheets

(56) References Cited

U.S. PATENT DOCUMENTS

| | | | |
|---|---|---|---|
| 2009/0280819 A1* | 11/2009 | Brisebois et al. | 455/446 |
| 2010/0029273 A1* | 2/2010 | Bennett | 455/435.2 |
| 2010/0248631 A1* | 9/2010 | Chaudhri et al. | 455/62 |
| 2011/0158147 A1* | 6/2011 | Li | H04W 72/082 370/312 |
| 2011/0182257 A1* | 7/2011 | Raveendran | H04H 20/61 370/329 |
| 2011/0216239 A1* | 9/2011 | Raveendran | H04N 21/235 348/384.1 |
| 2011/0250921 A1* | 10/2011 | Reial | H04B 7/086 455/517 |
| 2011/0312330 A1* | 12/2011 | Sadek | H04W 16/14 455/452.2 |
| 2012/0238227 A1* | 9/2012 | Gao | H04W 16/10 455/120 |
| 2012/0282942 A1* | 11/2012 | Uusitalo et al. | 455/452.2 |
| 2013/0159345 A1* | 6/2013 | Kahtava | G06F 17/30424 707/770 |
| 2013/0165170 A1* | 6/2013 | Kang | 455/509 |
| 2013/0208610 A1* | 8/2013 | Mach | H04W 24/10 370/252 |
| 2014/0066055 A1* | 3/2014 | Balakrishnan et al. | 455/432.1 |

\* cited by examiner

CONFIGURING CELLULAR CONNECTIVITY

RELATED APPLICATION

This application was originally filed as PCT Application No. PCT/FI2011/050214 filed Mar. 11, 2011.

FIELD

The invention relates to the field of wireless communications and, particularly, to configuring frequency aggregation in a cellular communication system.

BACKGROUND

Modern wireless telecommunication systems aim to efficient utilization of the available frequency spectrum so as to maximize capacity and throughput. Multiple systems or sub-systems may even be allocated to share a common frequency band which is shared in a dynamic manner between the systems. Such dynamic spectrum utilization requires capability of detecting free radio resources and taking them into use efficiently so as to ensure efficient operation and/or reduced interference towards other systems, for example.

BRIEF DESCRIPTION

According to an aspect of the present invention, there are provided methods as specified in claims 1 and 9.

According to another aspect of the present invention, there are provided apparatuses as specified in claims 16 and 25.

According to another aspect of the present invention, there is provided an apparatus as specified in claim 33.

According to yet another aspect of the present invention, there is provided a computer program product embodied on a computer readable distribution medium as specified in claim 34. According to yet another aspect, there is provided the computer readable distribution medium storing the computer program product.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
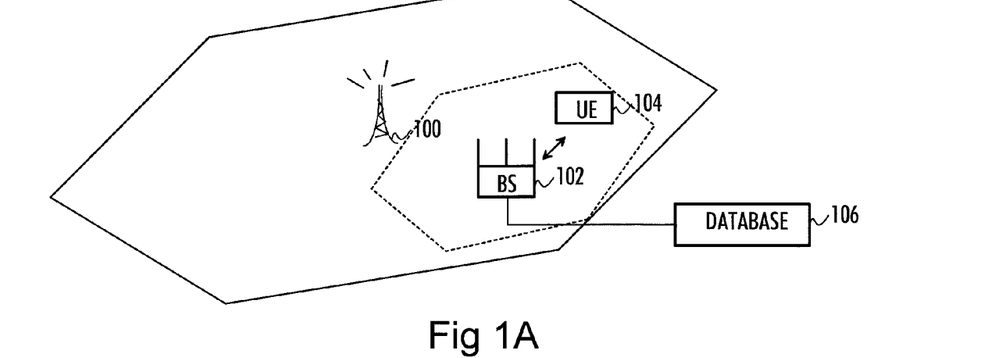
FIG. 1A illustrates communication between a terminal device and a cellular communication system.

A general communication scenario to which embodiments of the present invention may be applied is illustrated in FIG. 1A. Referring to FIG. 1A, at least two systems are located such that their coverage areas overlap at least partly and that they may be configured to operate on a common frequency band. For example, a first system may be a television (TV) broadcast system comprising a broadcast tower 100 broadcasting television channels on some channels of the common frequency band. The first system may, however, be any other radio system. A second system may be, for example, a cellular system comprising a network element 102 as an access point or a base station (BS, also called Node B or evolved node B, eNB) providing a client station (also called a terminal device or user equipment, UE) 104 with bidirectional wireless communication services. The cellular system may also utilize frequency channels on the common frequency band.

For example, the Federal Communications Commission (FCC) in the United States has issued a report and order (R&O) which permits the use of TV white space (TV WS) spectrum. White space is the term used by the FCC for a TV spectrum which is not being occupied for primary usage e.g. by the TV or wireless microphone transmitters. The cellular system comprising the network element 102 may be configured to utilize available frequency bands of such a spectrum having a frequency band on a very high frequency band (VHF, 30 to 300 MHz), ultra-high frequency band (UHF, 300 to 3000 MHz), and/or other frequency bands. With respect to the second system, the cellular system may be based on the Universal Mobile Telecommunication System (UMTS) or any one of its evolution versions (e.g. long-term evolution, LTE, or LTE-Advanced), a system based on International Mobile Telecommunication (IMT) standard or any one of its evolution versions (e.g. IMT-Advanced), Worldwide Interoperability for Microwave Access (Wi-MAX), IEEE 802.11-based network (e.g. IEEE 802.11n, 802.11af, or 802.11ac). However, the cellular system is not limited to these examples and it may be any other wireless network within the scope of the present claims. The first (primary) system also need not be a TV broadcast or a wireless microphone transmitter system, and it may be any other system having a frequency band that may be shared with the cellular system and that may become fragmented through the frequency utilization of the first system. The frequencies may also be available without any assigned primary user, e.g. their utilization may be based on cognitive radio access schemes. In a broad sense, the first system may be any system operating on an unlicensed or license-exempt frequency band, e.g. the Industrial, Scientific, and Medical (ISM) band.

In some embodiments, the first system is a primary system having a priority over the frequency bands. The cellular system may then be configured to dynamically adapt to the spectrum utilization of the primary system and occupy a frequency band not used by the primary system in a given geographical area. In the following description, let us refer to the first system as the primary system and to the cellular system as the secondary system. In such embodiments, there may be rules for the secondary system to ensure minimization/lack of interference towards the primary system, and these rules may require access to information on free frequency bands in each geographical area and/or sensing and use of specified maximum transmit power levels. Such information on the free frequency bands may be stored in a database 106 to which the network element 102 and/or the client station 104 has access. The database 106 may store the maximum transmit power limits that the network element and/or client stations may not exceed so as not to interfere with the users of the primary system. The network element 102 and/or the client station 104 may obtain the information on the free frequency channels either directly or indirectly through any other node that has access to the database 106. For example, a client station may have a direct access to the database 106 to retrieve the current channel allocation in the area of the client station, or it may request a serving base station or another network element to retrieve the contents of the database 106. The serving base station or the other network element may retrieve the contents of the database 106 through a mobility management entity (MME) of the cellular system, for example.

An operator of the primary system or an authority like a regulator may update the database 106 as the channel allocation of the primary system changes, and the network element 102 and/or the client station may periodically (or constantly or upon notification of a change in the contents of the database) monitor the database 106 for an updated channel allocation and take measures to adjust its own frequency allocation accordingly.

Figure 1B:
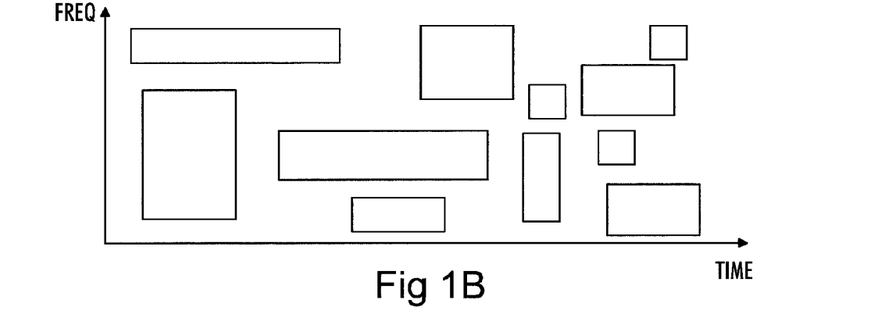
FIG. 1B illustrates an example of irregular utilization of frequency resources on an unlicensed spectrum.
Figure 2:
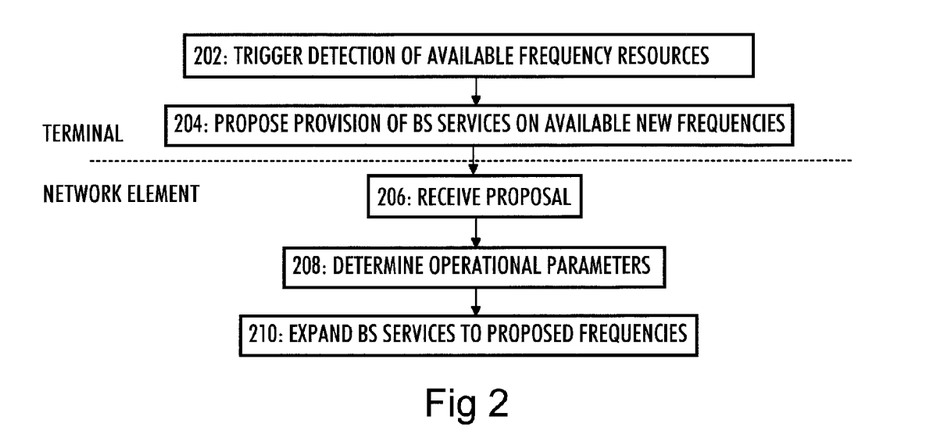
FIG. 2 illustrates a flow diagram of a process for initiating frequency aggregation according to an embodiment of the invention.

As shown in FIG. 1B, spectrum utilization of the white spaces or unlicensed bands, e.g. the ISM band, may be fragmented in both time and frequency. The irregular spectrum occupation is illustrated by the boxes in FIG. 1B. The primary system may occupy different frequencies based on time and location, while numerous wireless communication systems may occupy and release arbitrary frequencies on the unlicensed bands. These spectral spaces may hence lack a clear raster of center frequencies and bandwidths. Therefore, available frequencies may be scanned in various manners before taking them into use. FIG. 2 illustrates a general concept according to some embodiments of the invention, and further embodiments are described in greater detail thereafter. FIG. 2 illustrates a flow diagram of processes for aggregating frequencies outside the frequencies dedicated, e.g. licensed, to the cellular communication system to the cellular frequencies. FIG. 2 illustrates a process carried out in a terminal device, and a process carried out in a serving base station or another network element of a cellular network.

Referring to FIG. 2, the terminal device is caused to initiate detection of available frequency resources outside dedicated frequency resources of the cellular communication system in block 202. This detection may be autonomous by the UE or may be initiated by the UE after assistance received from a network node, say a server. Some embodiments of events triggering the detection are described below. The detection may comprise scanning the frequency components, as described below, or determining their availability from the database 106 or from information received from locally authorized nodes, e.g. a coexistence manager used in IEEE 802.19 networks. In response to detection of available frequency resources as a result of said scanning, the terminal device is caused to transmit to the serving base station in block 204 a message proposing provision of aggregation of at least some of scanned frequency resources detected to be available to the cellular frequencies.

In block 206, the network element of a network infrastructure receives from the terminal device, through a serving base station, the autonomously transmitted message proposing provision of aggregation of at least some of frequency resources outside dedicated frequency resources of the cellular communication system. In block 208, the network element determines operational parameters of the aggregation on the basis of said received message. In block 210, the network element configures aggregation of at least some of the proposed frequency resources with said determined operational parameters. The aggregation may be referred to as a carrier aggregation, wherein the network element configures establishment of new carriers on the frequencies outside the cellular frequencies. Carrier aggregation may be understood as aggregating white spaces, unlicensed frequencies or other free frequency resources to the frequencies on licensed bands of the cellular system. The carrier aggregation may be carried out in a base station, or generally the carrier aggregation may be realized by combined operation of a plurality of remote radio heads of a base station or non co-located base stations. Accordingly, the establishment of new carriers may be realized in the serving base station, in a remote radio head of the serving base station, or in another base station, e.g. a femtocell base station. The base stations realizing the aggregation may have different cell size hierarchies or even different access technologies. Aggregation may further mean aggregation of connections or network (e.g. Internet Protocol, IP, interfaces) for the traffic flows of a terminal device.

The remote radio head is by definition a spatially remote circuitry of the base station extending the coverage area of the base station, e.g. in tunnels and rural areas. The remote radio head may be a logic entity of the base station similar to radio components located at the base station site, and the remote radio head may comprise a radio frequency circuitry of the base station and, additionally analog-to-digital and digital-to-analog converter to convert signals transferred in a digital form between the remote radio head and the base station. The femtocell is a common term used in the modern communication systems to describe a small cellular base station typically designed for use in a home or small business, for example. The femtocell base station may be configured by the network element of the cellular network.

Figure 3:
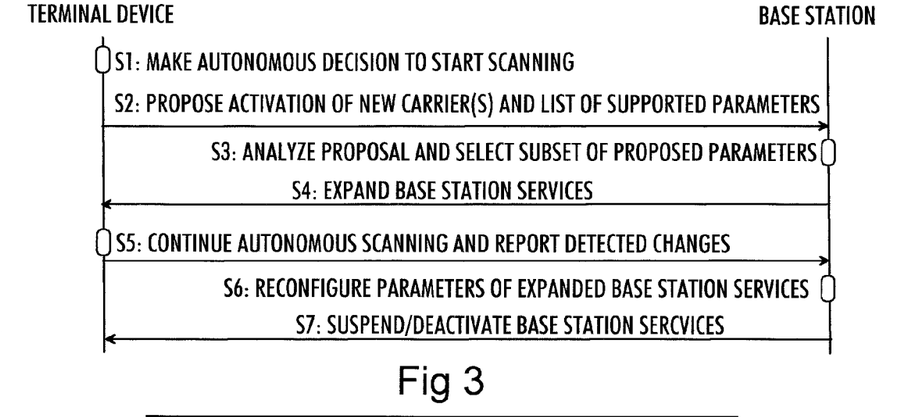
FIG. 3 illustrates a signaling diagram of initiating and configuring the frequency aggregation according to an embodiment of the invention.

With reference to a signaling diagram of FIG. 3, let us describe the initialization of the aggregation according to an embodiment. In S1, the terminal device makes the decision to start scanning for available frequencies outside the cellular frequencies. The decision may be made autonomously and in response to at least one of the following: detecting a need for additional data transfer capacity, degradation of link quality of at least one existing link with the cellular network, time, and/or location of the terminal device. Examples of the need for the additional data transfer capacity comprise establishment of a new data flow, e.g. a new connection to the Internet, or increased data transfer requirements of an existing data flow. Parameter "time" refers to that the triggering event for the scanning is the time, e.g. the scanning is carried out during the office hours, or another period(s) of time. The location as the triggering event may refer to the availability of location-based services, for which the scanning is triggered. In other embodiments, the location may trigger the scanning regardless of whether or not such location-based services are available. The database 106 may, for example, define locations where the white space frequencies are available, and arriving at such a location may trigger the scanning. In other embodiments, history data may be used as the triggering event. For example, prior timings and/or locations when the utilization of the frequencies outside the cellular frequencies has been successful may be as an input in S1. For example, such a timing and/or arriving at the same location/area may trigger the scanning. In general, the terminal device may be configured to make the decision of when, where, and how to carry out the scanning without reception of a specific command from the network infrastructure.

The actual scanning may comprise detection of free frequencies (or channels) by estimating presence of an arbitrary radio signal on the frequencies. In such embodiments, the terminal device may blindly attempt to detect of presence of radio energy on the frequencies and omit attempting to derive any information from the contents or signal structure of the (possible) radio signals. Such embodiments may comprise determining a radio signal power or energy on a given frequency band. The determined metric proportional to the power or energy may then also be considered as a measure of interference, and upon determining that the interference level or spectral density of the interference is higher than a determined threshold, the frequency band may be determined to be unavailable. On the other hand, upon determining that the interference level is lower than the threshold, the frequency band may be determined to be available. In other embodiments, the scanning comprises detecting beacon signals or other known signals having a structure and/or contents that the terminal device is capable of analyzing. Such signals may be used for detecting whether or not it is possible to coexist with a system transmitting such signals by using at least partially overlapping resources. An access network discovery and selection function (ANDSF) of the cellular network may be used as assistance when discovering other access networks, e.g. the IEEE 802.11 or WiMAX networks. The terminal device may be configured to carry out the scanning by using multiple variable carrier frequencies and multiple variable bandwidths in the scanning to improve the scanning and the probability of success of the scanning. The terminal device may also use history data to obtain initial parameters for the scanning, e.g. first scan for those frequencies and bandwidths that have previously provided a successful aggregation, provided that they are allowed by the database 106 (if applicable). The history data may be analyzed by using state-of-the-art machine learning algorithms, for example. The terminal device may restrict the scanning to cover only those frequencies that are supported by the terminal device, and those frequencies on which the terminal device cannot communicate because of implementation reasons, for example, may be excluded from the scanning. It should be noted that the scanning may comprise operations that are different from those used in the cellular network, as mentioned above, e.g. the detection of presence of radio energy. These detection operations may apply any mathematical sampling, filtering, averaging, windowing or weighting functions to create the actual measurement result.

Upon detection of a set of available frequencies, each identified by the explicit frequency, a channel index, and/or any other channel identifier, the terminal device constructs the message proposing the aggregation, wherein the message comprises a list of detected frequencies that are proposed candidates for the aggregation. The message may comprise other parameters proposed by the terminal device in additional to the frequency indices, e.g. bandwidth and quality-of-service related parameters, parameters acquired as a result of scanning such as operational parameters defined by existing system(s) on the scanned frequencies. The terminal device may be configured to filter the list of frequencies according to a determined criterion, e.g. prefer free frequencies over occupied frequencies even though coexistence with another system was possible, to remove from the list frequencies previously discovered as problematic on the basis of history data, for example, and/or filtering rules derived from the database 106. The filtering may also take into account Quality-of-Service (QoS) requirements of a data flow for which the terminal device intends to propose the aggregation. In such a case, frequencies providing a continuous bandwidth satisfying the QoS requirements may be selected over frequencies providing a fragmented spectrum, and bandwidth smaller than the minimum bandwidth of the QoS requirements may be discarded. In a situation where QoS requirements are not given or are not clear or strict, the target of the aggregation may be to maximize the available bandwidth, minimize the consumed transmission power, or to minimize experienced or generated interference.

Then, the terminal device may transmit in S2 the proposal message to the serving base station which may be the network element processing the proposal and making the decision on whether or not to carry out the frequency aggregation. It should be noted that the network element may be another element of the network infrastructure as well. If the list is filtered by discarding at least some of the parameters, the terminal device may include in the message an information element indicating that in case the network element finds no suitable parameters for the aggregation from the proposed list, the terminal device is prepared to transmit another list with further parameters for proposal. The other list may then comprise at least some of the parameters discarded in the filtering procedure. The message transmitted by the terminal device may be a Radio Resource Control message or a higher layer message.

Upon reception of the list of supported parameters in S2, the base station analyzes the proposal and determines whether or not the list contains a subset of parameters that may be configured for the aggregation. The base station may store a database defining allowed frequencies and frequency aggregation options, e.g. list of frequencies that may be aggregated to the cellular frequencies, and the frequency (or frequencies) for the aggregation may be selected as allowed by such restrictions. Furthermore, the base station may compare bandwidth requirement for the aggregation with the set of proposed frequencies, and select the frequencies such that the number of separate (disjoint) frequency proportions or frequency bands required is minimized, and the number of adjacent (contiguous) frequencies in use are maximized. The base station may also make a decision as to whether to realize the aggregation in the base station site, in a remote radio head, or in a femto base station. The femtocell base station may be under the control of the aggregating base station. For such a purpose, the base station may determine the location of the terminal device in the cell of the base station. The location may be determined on the basis of path loss estimations and/or timing advance of the terminal device. The timing advance is a parameter proportional to the distance between the terminal device and the base station. Additionally, beamforming and other spatial estimation algorithms may be used to determine the distance and the direction of the terminal device with respect to the base station on the basis of angle of reception of a signal from the terminal device, for example. If the terminal device is in a coverage area of a femtocell base station or a remote radio head, the base station may select spatially distributed aggregation in which the remote radio head or the femtocell base station is configured to apply the aggregation. On the other hand, if the spatially distributed is not possible or feasible on the basis of the location of the terminal device or for other reasons, the base station may be configured to select co-located aggregation in which the base station expands the frequency range on the base station site to cover at least some of the proposed frequencies outside the cellular frequencies. The base station may use as an additional criterion for selecting the parameters to be applied similar proposals received from other terminal devices. For example, if a determined number (a plurality) of terminal devices proposes a given frequency band, the base station may prefer that frequency band over one proposed only by a single or few terminal devices. As a consequence, the base station may attempt to carry out the aggregation with parameters that meet the demands of as many terminal devices as possible. Another criterion may be the cost of additional frequencies. The aggregation may be applied to frequencies that are charged on the basis of their utilization, and the base station may be configured to prefer frequencies that are free of charge over frequencies that are charged.

As a consequence, the base station selects a subset or even a full set of proposed parameters and configures the aggregation in S3 and S4. In S4, the base station applies the aggregation or activates a remote radio head or a femtocell base station to apply the aggregation. The base station may also inform the terminal device about the aggregation and the selected parameters. Then, the new resources may be applied to the communication by expanding resources of active links to the new frequencies and/or by providing new radio bearer services, e.g. a new carrier, on the new frequencies. During the operation of the aggregation, the terminal device may continue carrying out the measurements autonomously in S5, report the measurement results to the network, and the base station may apply new frequencies and/or discard current frequencies and change other operational parameters on the basis of the measurement results in S6. This may include temporary suspension or deactivation of the aggregation and reestablishment with new parameter, or the changes may be applied on the fly during the operation. As a consequence, the system is able to adapt to a changing radio environment which may be abrupt on the non-licensed frequencies. When the additional frequencies utilized as a result of the aggregation are now longer needed or when the additional frequencies become unavailable, the base station suspends or deactivates the utilization of the additional frequencies in S7. This may include controlled release of the frequency resources which may include release of at least one radio link allocated to the additional frequency resources.

Figure 4:
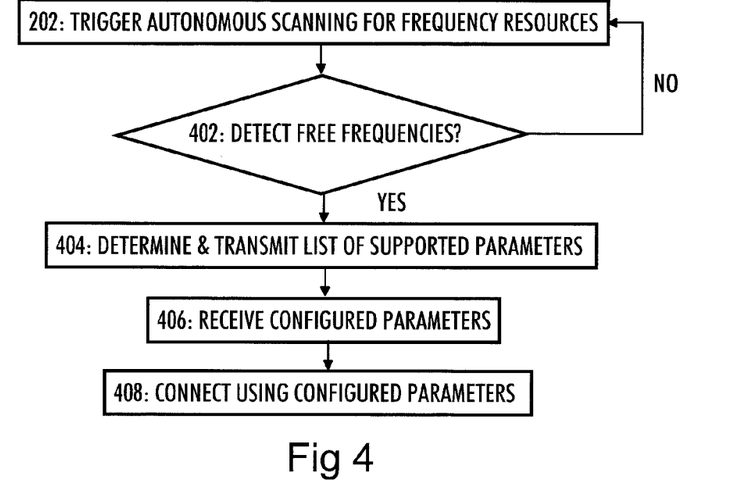
FIG. 4 illustrates operation in a terminal device for autonomously deciding to propose frequency aggregation according to an embodiment of the invention.

FIG. 4 illustrates a procedure of the terminal device for proposing the aggregation according to some embodiments of the invention. Referring to FIG. 4, the autonomous scanning of the frequency resources outside the cellular frequencies is triggered in 202. The triggering event may be any one of those listed above. The terminal device may select scanning parameters from the list of free white space frequencies derived from the database 106, for example. In one embodiment, the terminal device is configured to use a default bandwidth in the scanning, while in another embodiment, the terminal device applies a plurality of bandwidths for a given (or each) center frequency. As a consequence, the terminal device scans for the available frequencies by using a plurality of center frequencies and one bandwidth or a plurality of bandwidths for each center frequency. As mentioned above, the terminal device may determine a frequency to be free if no radio energy is detected on the frequency, the detected spectral density of received energy is below a tolerable threshold, and/or if the frequency is occupied by another system with which coexistence is possible. Such a system may be an IEEE 802.11 network, for example. In such a case, the terminal device may scan for a beacon frame broadcasted by the IEEE 802.11 network. In block 402, the terminal device determines whether or not a sufficient number of available frequencies have been detected. If it is determined as negative, the process returns to block 202 and the scanning is continued (optionally after a pause to reduce the power consumption). On the other hand, if the result in block 402 is affirmative, the process proceeds to block 404 in which the terminal device determines the parameters to be proposed for the aggregation and transmits list of proposed parameters to the base station. In block 406, the terminal device receives from the serving base station the parameters configured for the aggregation. In block 408, the terminal device applies the new frequencies. Block 408 may comprise negotiation of a new (secondary) radio bearer to realize the aggregation. The primary cellular connection may be maintained, as will be discussed below. The frequency aggregation may be applied to the existing radio connection, as mentioned above.

Figure 5:
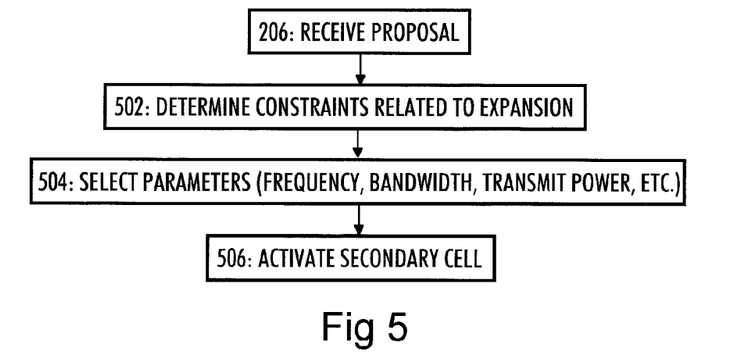
FIG. 5 illustrates operation in a network element upon receiving a proposal for frequency aggregation according to an embodiment of the invention.

FIG. 5 illustrates the operation of the base station controlling the aggregation according to some embodiments of the invention. In block 206, the base station receives the proposal for the aggregation and the list of proposed parameters. In block 502, the base station determines constraints related to the aggregation. Some of the constraints related to the selection of the aggregation frequencies and bandwidths have been discussed above. Other restrictions may include transmission power. For example, the database 106 may set the restrictions to the transmit powers on the white space frequencies. In block 502, the base station may determine the frequencies the base station is able to aggregate to the current cellular frequencies such that the power constraints of the white space frequencies as set in the database are satisfied. This may rule out at least some of the proposed frequencies. The transmit power needed may be determined by estimating the channel between the base station and the terminal device, e.g. a path loss. In block 504, the base station selects the parameters for the aggregation (e.g. frequencies, bandwidth, co-located or spatially distributed aggregation, etc.). In block 506, the base station carries out the aggregation by activating a secondary cell with the selected frequencies and parameters that are a subset of those proposed by the terminal device. The secondary cell may be understood as the femtocell base station or another entity which forms a cell which is different from the cell of the serving base station. However, it may be understood as a creation of a new carrier in the serving base station, e.g. in a remote radio head. The serving base station may in some embodiments configure the operation and resource scheduling in the secondary cell, e.g. in the case of remote radio head. However, in other embodiments, the secondary cell is independent to carry out the resource scheduling autonomously, e.g. in a case where the secondary cell in coexistence with another system, e.g. an IEEE 802.11 (WiFi) network or IEEE 802.19 network. In such an example, the secondary cell may carry out the communication according to the specifications of the other system. For example, when the other system is the WiFi network, the communication in the secondary cell may be configured to comply with the channel contention and other communication rules of the IEEE 802.11 networks.

With respect to activating a secondary cell operating only on the unlicensed frequencies, while it can be construed that the secondary cell carries out no frequency aggregation, the frequency aggregation between the cellular and non-cellular frequencies is nevertheless affected on the system level and from the viewpoint of the terminal device.

Figure 6:
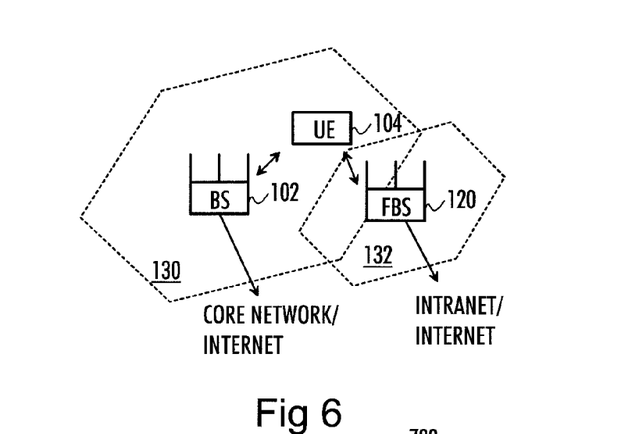
FIG. 6 illustrates utilization of a secondary cell in connection with frequency aggregation according to an embodiment of the invention.

FIG. 6 illustrates an embodiment of utilization of the aggregation. The terminal device 104 may have the primary cellular connection with the serving base station 102 (associated with a primary cell 130) before and after the aggregation. In other words, the primary cellular connection may be maintained, and the aggregated extra frequencies may be used as supplementing the primary cellular connection. The primary cellular connection may provide the terminal device 104 with the connection to the Internet through a core network of the cellular communication system, for example. In case the secondary cell is utilized through a remote radio head or through a relay base station or a repeater, the aggregated extra frequencies also provide the connection through the core network. However, when the extra frequencies are delegated to another base station, e.g. a femtocell base station 120 (FBS in FIG. 6) or an IEEE 802.11 access point controlling a secondary cell 132, the extra frequencies may be used to provide the terminal device 104 with a second connection to the Internet through the femtocell base station or the IEEE 802.11 access point and through network other than the network of the cellular communication system. The femtocell base station may utilize, for example, a Digital Subscriber Line or Ethernet network for the wired connection to the intranet/Internet. These transport network links may also comprise wireless links, like microwave links or WiMax links, that could be used for transport.

Figure 9:
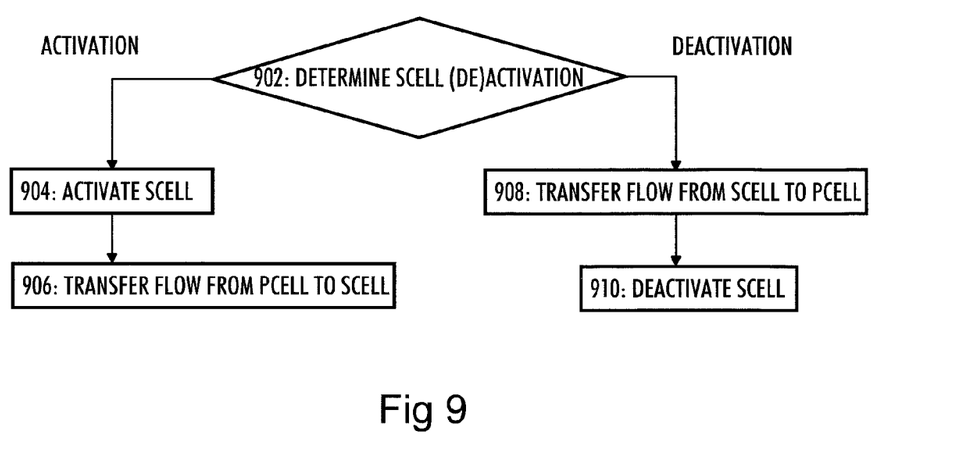
FIG. 9 illustrates a flow diagram for flow transfer upon establishing a secondary cell according to an embodiment of the invention.

According to an embodiment, flow routing transfer between the primary cell (PCELL) connection and the secondary cell (SCELL) connection is carried upon activation and/or deactivation of the secondary cell and, optionally during the operation of the primary and secondary cell connections. The transfer of data flows between the two connections may also be called flow mobility. Referring to FIG. 9, let us consider a process for flow mobility. The process may be carried out in the network element making the decision about the aggregation. Let us assume that initially a terminal device has a primary cell connection with the cellular network, wherein at least a first data flow is routed through the primary cell connection. In block 902, the network element makes a decision about activating or deactivating a secondary cell. When the decision in block 902 is the activation of the secondary cell, the network element configures the activation of the secondary cell in block 904 and allocates frequency band and other parameters for the secondary cell. From the viewpoint of the terminal device, block 904 comprises establishment of a secondary cell connection, and the terminal device now operates both the primary cell connection and the secondary cell connection similar to that illustrated in FIG. 6. Upon establishment of the secondary cell connection, the network element transfers at least some of the data of the first data flow to the secondary cell connection in block 906. Some of the data of the first data flow may still be routed through the primary cell connection. Additionally, a second data flow may be created for the secondary cell connection. The data flow in this context may refer to a higher layer data flow, e.g. a network layer or even a higher layer data flow. The data flow distributed to the primary and secondary cell connection may be aggregated on some layer (e.g. Internet protocol layer) in the cellular network and also in the terminal device.

Let us consider a situation where the secondary cell is activated, and the terminal device operates both the primary cell connection and the secondary cell connection. Upon deciding to deactivate the secondary cell in block 902, the network element may trigger the transfer of the data flows from the secondary cell connection to the primary cell connection 908. Block 908 may also comprise terminating at least one data flow. Upon completing the data flow transfer, the network element may configure the deactivation of the secondary cell in block 910 and release its frequency resources.

The flow transfer may be proposed by the terminal device in its proposal for carrying out the aggregation. The proposal message may comprise an information element which indicates whether the new frequency resources should be used for the provision of at least one new data flow or for additional capacity to at least one existing active data flow. However, the terminal device may make such a flow transfer proposal in connection with negotiating the secondary cell connection. The flow transfer may be triggered during the operation on the basis of qualities of the connections, e.g. more data may be routed to a connection having a better quality.

It should be noted that upon expanding the operation to the unlicensed frequencies and upon creating the SCELL connection for the terminal device, the PCELL connection may even be released or temporarily discontinued, while all the data routing is carried out over the SCELL connection. The discontinuation of PCELL connection may happen according to a negotiated discontinuity pattern, where the radio transmission is periodically OFF, while still maintaining the logical association between the terminal and the serving PCELL base station.

With respect to charging for the utilization of the extra frequencies additional to the cellular frequencies, an operator may add the additional costs incurred by the utilization of the secondary cell directly to the communication bills of the subscriber on the basis of the utilization of the extra frequencies. The costs may be tracked by a packet data network (PDN) gateway node of the UMTS LTE network (or a similar element in other systems) that tracks costs of traffic. The serving base station may acquire accurate statistics about the amount of traffic delivered via the primary cell connections and the secondary cell connections, and the duration a secondary cell connection on a given frequency band has been active for a given terminal device.

Figure 7:
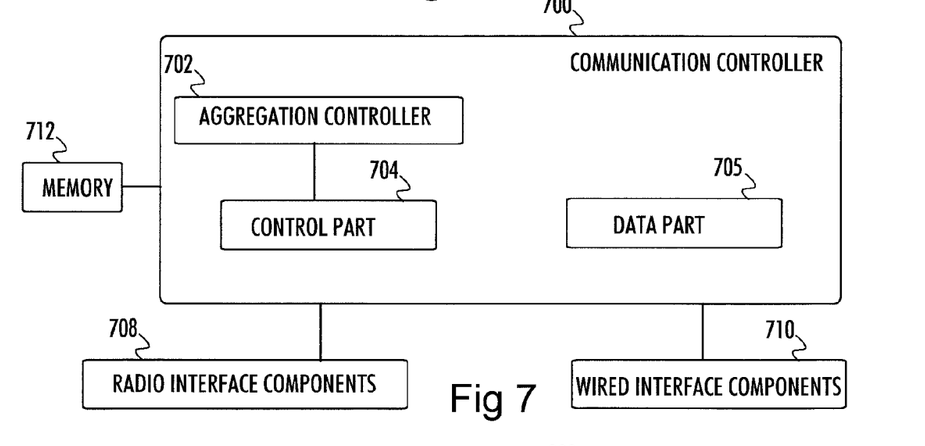
FIGS. 7 and 8 illustrate block diagrams of apparatuses according to some embodiments of the invention.

FIG. 7 illustrates an embodiment of an apparatus comprising means for carrying out the above-mentioned functionalities of the network element. The apparatus may be applicable to a cellular communication system described above and it may form part of a base station or another network element of such a system. In an embodiment, the apparatus is the base station. In another embodiment, the apparatus is comprised in such a network element, e.g. the apparatus may comprise a circuitry, e.g. a chip, a processor, a micro controller, or a combination of such circuitries in the network element and cause the network element to carry out the above-described functionalities.

The apparatus may comprise a communication controller circuitry 700 configured to control the communications in the apparatus. The communication controller circuitry 700 may comprise a control part 704 handling control plane signaling in a cell. For example, the control part may control establishment, operation, and termination of cellular connections with terminal devices and carry out radio resource control procedures in a cell. The communication controller circuitry 700 may further comprise a data part 705 that handles transmission and reception of payload data with the terminal devices. The data part 705 may forward data received from the terminal devices towards the core network and data received from the core network to the terminal devices.

The apparatus may further comprise a aggregation controller circuitry 702 configured to receive from at least one terminal device through the control part 704 a proposal for aggregation of frequencies outside the frequencies dedicated to the cellular system, e.g. the white space frequencies and/or the ISM band. The proposal may identify proposed frequencies and/or other operation parameters for the aggregation. The aggregation controller circuitry 702 may process the proposal by determining whether or not the proposal comprises a subset of parameters that are applicable to and compatible with current operational parameters in the cell and/or in the cellular system. The aggregation controller circuitry 702 may also determine how to implement the aggregation, e.g. whether to activate and configure a femtocell base station to the proposed frequencies or whether to establish at least one new carrier in a currently operational base station. If a subset of parameters is detected and the aggregation is found to be feasible, the aggregation controller circuitry 702 configures the aggregation of such unlicensed frequencies by configuring the control part to carry out the aggregation or to command a femtocell base station to execute the aggregation. During the operation of the aggregation, the aggregation controller circuitry 702 may control reconfiguration of the operational parameters for the aggregation and deactivation of the aggregation, as described above.

The circuitries 702 to 705 of the communication controller circuitry 700 may be carried out by the one or more physical circuitries or processors. In practice, the different circuitries may be realized by different computer program modules. Depending on the specifications and the design of the apparatus, the apparatus may comprise some of the circuitries 702 to 705 or all of them.

The apparatus may further comprise one or more memories 712 that stores computer programs (software) configuring the apparatus to perform the above-described functionalities of the communication device. The memory 712 may also store communication parameters and other information needed for the wireless communications and/or to carry out the aggregation. For example, the memory 712 may store a list of allowed frequencies on the unlicensed bands and/or a list of preferred frequencies or frequency band combinations for use by the aggregation controller circuitry 702. The apparatus may further comprise radio interface components 708 providing the apparatus with radio communication capabilities with the terminal devices and/or other network nodes, e.g. with femtocell base stations. The radio interface components 708 may comprise standard well-known components such as amplifier, filter, frequency-converter, (de)modulator, and encoder/decoder circuitries and one or more antennas. The apparatus may further comprise wired interface components 710 that may be configured to provide the apparatus with a wired connection to other elements of the cellular system, e.g. the core network. The wired interface components may realize an IP connection or an S1 connection used in the UMTS LTE networks, for example.

In an embodiment, the apparatus carrying out the embodiments of the invention for controlling the aggregation comprises at least one processor and at least one memory including a computer program code, wherein the at least one memory and the computer program code are configured, with the at least one processor, to cause the apparatus to carry out the steps of the network element in any one of the processes of FIGS. 2, 3, and 5. Accordingly, the at least one processor, the memory, and the computer program code form processing means for carrying out embodiments of the present invention in the network element.

Figure 8:
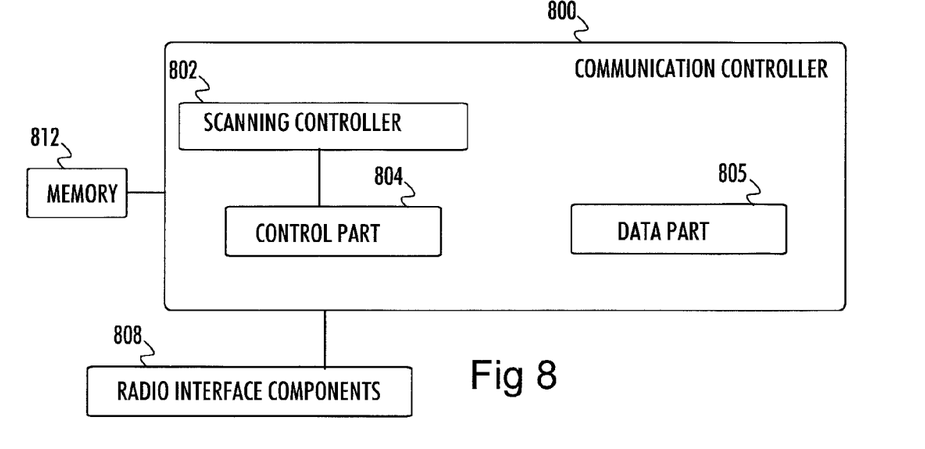

FIG. 8 illustrates an embodiment of an apparatus comprising means for carrying out the above-mentioned functionalities of the terminal device. The apparatus may be a terminal device of a cellular communication system, e.g. a computer (PC), a laptop, a tabloid computer, a cellular phone, a communicator, a smart phone, a palm computer, or any other communication apparatus. In another embodiment, the apparatus is applicable to such a terminal device, e.g. the apparatus may comprise a circuitry, e.g. a chip, a processor, a micro controller, or a combination of such circuitries in the terminal device.

The apparatus may comprise a communication controller circuitry 800 configured to control the communications in the apparatus. The communication controller circuitry 800 may comprise a control part 804 handling control plane signaling with a serving base station and, optionally, with other base stations or communication devices including other terminal devices in direct device-to-device connections. For example, the control part 804 may control establishment, operation, and termination of cellular connections with the cellular network and carry out radio resource control procedures in the terminal device under the control of the cellular network. The communication controller circuitry 800 may further comprise a data part 805 that handles transmission and reception of payload data with the cellular network and/or with other base stations or terminal devices. The data part 805 may forward data received from an application executed in the terminal device towards the cellular network and data received from the cellular network to the application.

The apparatus may further comprise a scanning controller circuitry 802 configured to operate autonomously and independent of the cellular network when determining to trigger scanning of free frequencies outside the frequency band(s) of the cellular network. The scanning controller circuitry 802 may be configured to determine at least some of the scanned frequencies from information on free white space frequencies retrieved from the database 106, thereby limiting the frequency range to be scanned. The scanning controller circuitry 802 may limit the number of scanned frequencies and/or bandwidth by other means. The scanning controller circuitry 802 may carry out the scanning according to a determined scanning procedure in which the scanning controller circuitry 802 scans for presence of radio energy and/or attempts to detect a determined signal structure on scanned frequencies, as described above. Upon detecting available frequencies, the scanning controller circuitry 802 may be configured to construct a message for transmission to a serving base station, wherein the message comprises a list of available frequencies and, optionally, other parameters proposed for the aggregation. The message may be constructed upon determining to propose the aggregation so as to activate the aggregation or after the aggregation has been carried out so as to reconfigure the operational parameters of the aggregation. The message may also be formulated to propose deactivation of the aggregation. The scanning controller circuitry 802 may command the control part 804 to carry out the transmission of the message to the serving base station. The control part 804 may be configured to receive from the network information on the aggregation of the unlicensed frequencies, and to control the terminal device to apply the aggregation by configuring establishment of a new radio bearer or by other means under the control of the cellular network.

The circuitries 802 to 805 of the communication controller circuitry 800 may be carried out by the one or more physical circuitries or processors. In practice, the different circuitries may be realized by different computer program modules. Depending on the specifications and the design of the apparatus, the apparatus may comprise some of the circuitries 802 to 805 or all of them.

The apparatus may further comprise one or more memories 812 that stores computer programs (software) configuring the apparatus to perform the above-described functionalities of the communication device. The memory 812 may also store communication parameters and other information needed for the wireless communications and/or to carry out the scanning. For example, the memory 812 may store a list of allowed frequencies on the unlicensed bands and/or a list of preferred frequencies or frequency band combinations for use by the scanning controller circuitry 802. The apparatus may further comprise radio interface components 808 providing the apparatus with radio communication capabilities with the cellular network and/or other base stations, e.g. with femtocell base stations, and/or with other terminal devices over direct device-to-device radio links. The radio interface components 808 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention for proposing the aggregation comprises at least one processor and at least one memory including a computer program code, wherein the at least one memory and the computer program code are configured, with the at least one processor, to cause the apparatus to carry out the steps of the terminal device in any one of the processes of FIGS. 2, 3, and 4. Accordingly, the at least one processor, the memory, and the computer program code form processing means for carrying out embodiments of the present invention in the terminal device.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of cellular telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   initiating, in a user equipment of a cellular communication system, detection of frequency resources available outside of dedicated band of frequency resources of the cellular communication system; and
   transmitting, to a serving base station of the cellular communication system, a message proposing carrier aggregation of at least some of the frequency resources detected to be available for use by at least the user equipment of the cellular communication system, when the detection identifies frequency resources available outside of the dedicated band of frequency resources of the cellular communication system.

2. The method of claim 1, wherein the decision about the initiation of the detection is made autonomously in the user equipment.

3. The method of claim 1, further comprising:
   determining a list of parameters for the proposed carrier aggregation; and
   including the determined list of parameters in the message.

4. The method of claim 1, wherein a triggering event for causing the initiation of the detection is at least one of the following: detection of need for additional data transfer capacity or detection of degradation of link quality, time, and/or location of the user equipment.

5. The method of claim 1, wherein the frequency resources available outside of the dedicated band of frequency resources of the cellular communication system are white space frequencies comprising television frequencies, wireless microphone frequencies, unlicensed frequencies, and/or license exempt frequencies primarily reserved for a primary system, wherein the white space frequencies are available for the cellular communication system as a secondary system if allowed by the primary system.

6. The method of claim 1, wherein the detection comprises scanning the frequency resources in order to detect whether or not the frequency resources are available.

7. The method of claim 6, wherein the scanning comprises at least one of detecting presence or absence of radio energy on the frequency resources and detecting a signal structure on the frequency resources.

8. The method of claim 1, further comprising:
upon configuring the carrier aggregation of the frequency resources available outside of the dedicated band of frequency resources of the cellular communication system, causing the user equipment to monitor for properties of a connection allocated to the frequency resources available outside of the dedicated band of frequency resources of the cellular communication system; and
on the basis of the monitored properties, causing the user equipment to propose reconfiguration of operational parameters with respect to the carrier aggregation of the frequency resources available outside of the dedicated band of frequency resources of the cellular communication system.

9. An apparatus comprising:
at least one processor; and
at least one memory including a computer program code, wherein the at least one memory and the computer program code are configured to, with the at least one processor, cause the apparatus to at least:
initiate detection of frequency resources available outside of the dedicated band of frequency resources of a cellular communication system; and
transmit, to a serving base station of the cellular communication system, a message proposing carrier aggregation of at least some of the frequency resources detected to be available for use by at least the apparatus of the cellular communication system, when the detection identifies frequency resources available outside of the dedicated band of frequency resources of the cellular communication system.

10. The apparatus of claim 9, wherein the at least one memory and the computer program code are configured to, with the at least one processor, at least cause the apparatus to make a decision about the initiation of the detection autonomously.

11. The apparatus of claim 9, wherein the at least one memory and the computer program code are further configured to, with the at least one processor, at least cause the apparatus to determine a list of parameters for the proposed carrier aggregation and to include the determined list of parameters in the message.

12. The apparatus of claim 9, wherein a triggering event for causing the initiation of the detection is at least one of the following: detection of need for additional data transfer capacity or detection of degradation of link quality, time, and/or location of the apparatus.

13. The apparatus of claim 9, wherein the frequency resources outside dedicated band of frequency resources of the cellular communication system are white space frequencies comprising television frequencies, wireless microphone frequencies, unlicensed frequencies, and/or license exempt frequencies primarily reserved for a primary system, wherein the white space frequencies are available for the cellular communication system as a secondary system if allowed by the primary system.

14. The apparatus of claim 9, wherein the at least one memory and the computer program code are further configured to, with the at least one processor, at least cause the apparatus to carry out the detection by scanning the frequency resources in order to detect whether or not the frequency resources are available.

15. The apparatus of claim 14, wherein the at least one memory and the computer program code are further configured to, with the at least one processor, at least cause the apparatus to during the scanning perform at least one of detecting presence or absence of radio energy on the frequency resources and detecting a signal structure on the frequency resources.

16. The apparatus of claim 9, wherein the at least one memory and the computer program code are further configured to, with the at least one processor, cause the apparatus to at least:
upon configuring the carrier aggregation of the frequency resources available outside of the dedicated band of frequency resources of the cellular communication system, monitor for properties of a connection allocated to the frequency resources available outside of the dedicated band of frequency resources of the cellular communication system; and
on the basis of the monitored properties, propose reconfiguration of operational parameters with respect to the carrier aggregation of the frequency resources available outside of the dedicated frequency band of resources of the cellular communication system.

17. An apparatus, comprising:
at least one processor; and
at least one memory including a computer program code, wherein the at least one memory and the computer program code are configured to, with the at least one processor, cause the apparatus to at least:
receive, from a user equipment of a cellular communication system, a message proposing carrier aggregation of at least some of frequency resources available outside of dedicated band of frequency resources of the cellular communication system;
determine operational parameters for the carrier aggregation on the basis of the received message; and
aggregate at least some of the proposed frequency resources available for at least the user equipment and with the determined operational parameters.

18. The apparatus of claim 17, wherein the at least one memory and the computer program code are further configured to, with the at least one processor, at least cause the apparatus to determine the operational parameters by analyzing a list of operational parameters proposed by the user equipment and by selecting a subset of operational parameters proposed by the user equipment.

19. The apparatus of claim 17, wherein the at least one memory and the computer program code are further configured to, with the at least one processor, at least cause the apparatus to carry out the carrier aggregation by establishing a secondary cell configured to provide the user equipment with a radio connection on at least some of the proposed frequency resources.

20. The apparatus of claim 17, wherein the at least one memory and the computer program code are further configured to, with the at least one processor, at least cause the apparatus to carry out the carrier aggregation by causing transmission of a signal that instructs the activation of the at least some of the proposed frequency resources with the determined operational parameters, to determine deactivation of the carrier aggregation, and to cause transmission of a signal that instructs the deactivation of the carrier aggregation of at least some of the proposed frequency resources.

21. The method of claim 1, wherein the carrier aggregation comprises one or more first carriers in a cellular frequency band and one or more second carriers in a white space frequency band outside of the cellular frequency band.

* * * * *